P. ERB.
CLAMP.
APPLICATION FILED OCT. 8, 1921.
1,434,738. Patented Nov. 7, 1922.
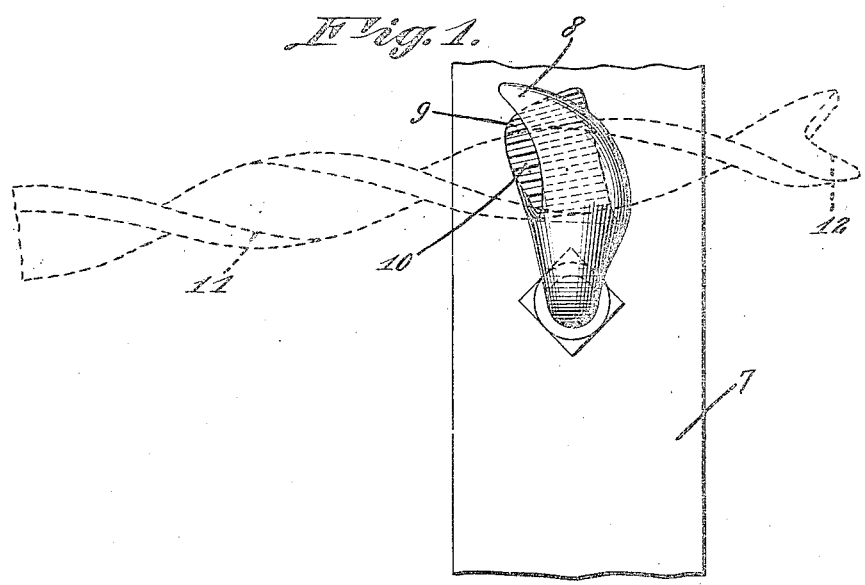
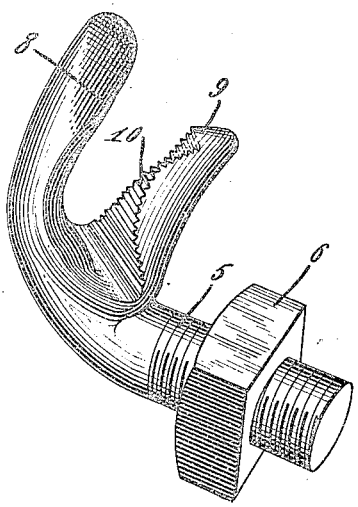
P. Erb, Inventor Patented Nov. 7, 1922.

1,434,738

UNITED STATES PATENT OFFICE.

PETER ERB, OF THE PLAINS, OHIO.

CLAMP.

Application filed October 3, 1921. Serial No. 506,472.

*To all whom it may concern:*

Be it known that I, PETER ERB, a citizen of the United States, residing at The Plains, in the county of Athens and State of Ohio, have invented a new and useful Clamp, of which the following is a specification.

This invention relates to clamps or supports and more particularly to an improved support especially designed for supporting an auger or the like to facilitate the sharpening thereof.

The primary object of the invention is to provide a device of this character wherein the weight of the auger or bit supported by the device will cause a binding action between the auger and clamp and insure the auger being held stationary during the sharpening operation.

Another object of the invention is to provide a clamp which may be applied to the auger prior to positioning the clamp on a suitable bench or support.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a plan view of the clamp disclosing a portion of an auger as supported therein.

Figure 2 is a perspective view of the same.

Referring to the drawing in detail, the clamp embodies a shank 5 which is threaded to fit in a suitable threaded opening of a bench or similar supporting device, there being provided a nut 6 also operating on the threaded portion, which nut may be rotated and forced into close engagement with the support, which in the present showing is indicated by the reference character 7 to prevent rotation of the clamp.

Jaws 8 and 9 are formed integral with the shank 5 and as shown, these jaws are curved in opposite directions as clearly shown by Figure 1 of the drawing. Teeth 10 are formed on the jaw 9 and are designed to bite into the auger, which is indicated in dotted lines in Figure 1 of the drawing and depicted by the reference character 11, it being understood that the auger is positioned in the clamp adjacent to the cutting end thereof, the weight of the auger overhanging the clamp, being sufficient to cause a binding action between the auger and clamp resulting in the teeth being embedded in the auger.

From the foregoing it will be seen that the curvatures of the jaws correspond with the curvature of the auger so that the jaws will closely engage the auger.

In the use of the device an auger is positioned in the clamp in a manner as described, whereupon the cutting edge of the auger which is indicated at 12, may be readily and easily filed and sharpened.

It is believed that in view of the foregoing description, a further detail description as to the use of the device is unnecessary.

Having thus described the invention, what is claimed as new is:

In a device of the character described, a threaded shank adapted to be positioned in a threaded opening of the support, means on the shank for locking the shank to its support, laterally extending jaws, said jaws adapted to receive a spirally formed tool, and means on one of the jaws to bite into the tool to prevent movement thereof.

In testimony that I claim the foregoing as my own, I have hereto affixed my signature in the presence of two witnesses.

PETER ERB.

Witnesses:
JOSEPH EVANS,
HUBERSON SMART.